United States Patent [19]

Cilano

[11] Patent Number: 5,415,601
[45] Date of Patent: May 16, 1995

[54] PARALLEL-AXIS DIFFERENTIAL WITH RESTRAINED CENTER WASHER

[75] Inventor: Joseph E. Cilano, Bergan, N.Y.

[73] Assignee: Zexel-Gleason USA, Inc., Rochester, N.Y.

[21] Appl. No.: 75,133

[22] Filed: Jun. 10, 1993

[51] Int. Cl.⁶ .............................................. F16H 48/10
[52] U.S. Cl. .................................. 475/160; 475/248; 475/252
[58] Field of Search ............... 475/159, 160, 248, 249, 475/252

[56] References Cited

U.S. PATENT DOCUMENTS

| | | | |
|---|---|---|---|
| 2,070,569 | 2/1937 | Asam | 475/226 |
| 2,269,734 | 1/1942 | Powell | 475/252 |
| 3,375,736 | 4/1968 | Saari | 475/160 |
| 3,706,239 | 12/1972 | Myers | 475/226 |
| 4,365,524 | 12/1982 | Dissett et al. | 475/226 |
| 4,491,036 | 1/1985 | Stritzel | 475/227 |
| 4,890,511 | 1/1990 | Pedersen | 475/160 |
| 5,108,353 | 4/1992 | Brewer et al. | 475/252 |
| 5,122,101 | 6/1992 | Tseng | 475/252 |
| 5,122,102 | 6/1992 | Chludek et al. | 475/249 |
| 5,169,370 | 12/1992 | Dye et al. | 475/227 |

FOREIGN PATENT DOCUMENTS

| | | |
|---|---|---|
| 0130806 | 1/1985 | European Pat. Off. . |
| 0260828 | 3/1988 | European Pat. Off. . |
| 4223374 | 1/1994 | Germany . |
| 2278043 | 11/1990 | Japan ................................. 475/159 |
| 237300 | 8/1945 | Switzerland . |

*Primary Examiner*—John J. Vrablik
*Attorney, Agent, or Firm*—Eugene Stephens & Associates;

[57] ABSTRACT

In the disclosed torque-proportioning type of automotive differential, a parallel-axis planetary gear arrangement interconnects the ends of a pair of coaxial drive axles. The axles are received, respectively, by a pair of sun/side gears having helical teeth and confronting end faces and being interconnected by planetary sets of combination gears. Each combination gear of each planetary set is provided with a narrowed shank portion intermediate two separate and distinct meshing portions in mesh with a respective one of the side gears and/or another combination gear of its respective planetary set. A washer component is positioned with its opposite sides in engagement with the confronting end faces of the side gears and is restrained from rotation by a plurality of radially-extending support regions positioned, respectively, between the shank portions of two combination gears of said planet gear sets. The sides of the washer component can be provided with radial grooves to facilitate lubrication and/or with materials having differing coefficients of friction to modify the torque-bias characteristics of the differential.

9 Claims, 3 Drawing Sheets

PARALLEL-AXIS DIFFERENTIAL WITH RESTRAINED CENTER WASHER

TECHNICAL FIELD

The invention relates to torque-proportioning automotive differentials of the parallel-axis type having planetary gear arrangements carried within housings that interconnect a pair of rotatable drive axles.

BACKGROUND OF INVENTION

Gear differentials generally include compound planetary gear sets interconnecting a pair of drive axles to permit the latter to rotate in opposite directions with respect to a differential housing. The drive axles rotate about a common axis; and a pair of respective sun gears (often called "side" gears) are fixed for rotation with the inner ends of the two drive axles, such gears acting as the sun gear members of the compound planetary gear sets. The side gears are interconnected by the planet gear members of the sets. The planet gears (sometimes referred to as "element" or "combination" gears) are most commonly arranged as sets of meshing pairs, being spaced circumferentially and equidistant about the common axis of the sun gears (e.g., four pairs arranged at 90° intervals or three pairs at 120° intervals); and the planet gears may be mounted for rotation about axes that are parallel to, or variously offset and inclined with respect to, a common axis of the sun gears and drive shafts. My invention relates to "parallel-axis" differentials in which the planet gears are mounted on axes parallel to the common axis of the side gears.

The entire planetary gearing arrangement within the differential housing supports opposite relative rotation between the drive axle ends (i.e., differentiation), which is necessary to permit the axle ends to be driven at different speeds. Torque transmitted to the drive axles through the inclined tooth surfaces of the sun/side gears generates thrust forces against gear-mounting bearing surfaces within the differential. (Such bearing surfaces may comprise journals formed in the housing, or may be the ends of bores into which the gears are received, or may be special washers positioned between the end faces or shaft ends of the gears and the housing.) The thrust forces, together with other loads conveyed by the gear meshes in the planetary gearing, produce a frictional resistance to relative rotation between the drive axles, this frictional resistance being proportional to the torque applied to the differential housing. The proportional frictional resistance supports different amounts of torque between the two drive axles to prevent their relative rotation until the characteristic "bias" ratio of the planetary gearing arrangement is reached. Once the frictional resistance is overcome and differentiation begins, the torque difference between the axles is proportioned in accordance with the bias ratio. Differentials that divide torque in a substantially constant ratio between relatively rotating drive axles are referred to as "torque-proportioning" differentials.

The ability to support different amounts of torque between the drive axles is of great benefit to improving traction capabilities of vehicles. Ordinarily, when one wheel of a vehicle with a conventional differential loses traction, the amount of torque that can be delivered to the other drive wheel is similarly reduced. However, when one wheel loses traction so that there is differentiation between the two axles, torque-proportioning differentials deliver an increased amount of torque to the drive wheel having better traction, such increased torque being determined by the characteristic bias ratio of the differential.

In typical parallel-axis torque-proportioning differentials (e.g., U.S. Pat. Nos. 2,269,734 to L. S. Powell and 3,706,239 to A. F. Myers), each planet gear is in mesh with a paired planet gear, and each planet gear in the pair meshes, respectively, with one of the side gears; and one axial end of each individual planet gear is in mesh with its respective side gear, while its other axial end is in mesh with its paired planet gear. That is, in most parallel-axis torque-proportioning differentials, the planetary gear pairs mesh with each other at only one of their axial ends, and their respective loads are often carried primarily by only one end of their axial mounting supports.

However, one parallel-axis differential of more recent design (commonly owned U.S. Pat. No. 5,122,101 to G. B. Tseng) provides such differentials with an increase in frictional surfaces and greater control over bias ratio. In this recent design, the paired planetary gears of each circumferentially-spaced set mesh with each other at two separated areas of engagement. That is, each combination gear of the pair is in mesh with a respective one of the side gears, and each shares two separate and distinct meshing areas with its paired combination gear. For each combination gear, the two meshing portions shared with its paired gear "straddle" the portion of the gear which is in mesh with its respective side gear. Preferably, the shared mesh portions are located at the two axial outer ends of the combination gears. This arrangement also improves the load balance on the planetary gear mounting supports.

As indicated above, when torque is transmitted to the drive axles through the inclined tooth surfaces of the sun/side gears, thrust forces are generated within the differential. Some of these axially-directed thrust forces cause the confronting end faces of the side gears and/or of their respective drive axles to be directed against each other. In prior art parallel-axis differentials, blocks are often positioned between these confronting end faces, being used (a) with spring bias to increase the frictional resistance to relative rotation between the axles (e.g., U.S. Pat. No. 3,375,736 to O. E. Saari), and/or (b) to maintain the position and separation of the confronting faces (e.g., U.S. Pat. No. 4,365,524 to W. L. Dissett et al).

However, such separating block arrangements are relatively complex and add to the cost of manufacturing and maintaining the differential; and therefore, most commercially-acceptable designs of torque-proportioning differentials do not incorporate such relatively expensive separating arrangements. Nonetheless, the confronting end faces of the side gears are still subject to undesirable wear, and it would be preferable to minimize such wear if it could be achieved in a simple and economical manner.

These confronting end faces are also involved in the following basic design problem: To achieve certain desired torque-bias characteristics in many popular differential designs, torque-proportioning differentials of both parallel-axis and inclined-axis types often provide the side gears with helix angles inclined in the same direction with respect to their common axis of rotation, causing both side gears to be thrust toward the same side of the housing whenever power is applied to the housing to effect forward motion on the vehicle. With this gearing arrangement, when differentiation causes torque to be transferred between the axles in a first direction of relative rotation (e.g., from the left axle to the right axle), the transfer is opposed by a first bias ratio; however, when torque is transferred between the axles in the opposite direction of relative rotation (e.g., from the right axle to the left axle), the transfer is opposed by a different bias ratio.

To help overcome this unequal bias problem in inclined-axis differentials, commonly owned U.S. Pat. No. 4,890,511 (H. Pedersen) proposes the insertion of a non-rotatable washer element between the confronting faces of the side gears, the washer element being provided (a) with radially outwardly directed projections which engage the main body portion of the housing to prevent rotation of the washer element, and (b) with different coefficients of friction on its opposite side surfaces to reduce and/or control such bias-ratio differences.

The just-described Pedersen washer element is easily adapted into differentials of the crossed-axis design. However, parallel-axis differentials in present use commercially have housing and gear arrangement designs that would require significant modifications in order to accommodate bias-adjusting washers according to the teachings of the Pedersen reference. Therefore, in spite of the fact that parallel-axis differentials continue to be affected by the unequal bias ratio problem as well as by undesirable wear at the confronting end faces of the side gears, I am unaware of any prior art disclosing an economical, simple-to-manufacture washer element which can be easily installed in present commercial designs of parallel-axis differentials to provide a thin, non-rotating barrier between the confronting end faces of the side gears.

My invention addresses these parallel-axis design problems.

SUMMARY OF THE INVENTION

The preferred embodiment of my invention is a parallel-axis torque-proportioning differential of the type referred to above as disclosed in U.S. Pat. No. 5,122,101 (Tseng) and having three sets of planetary gears, each set comprising at least one pair of meshing combination gears. This known differential is modified to provide a thin washer component positioned between the confronting end faces of the side gears. Although the washer component is restrained so that it does not rotate, it does not abut or otherwise engage the housing, and no additional protrusions or other support surfaces are added to the original housing design.

In the preferred embodiments, the washer component is provided with three radially-extending support regions, and its rotation is prevented by an arrangement in which each of these support regions cooperates with the differential's three planetary sets of combination gear pairs. As indicated above, each combination gear is in mesh with another combination gear of its set at two separated areas which "straddle" the position where the combination gear meshes with its respective side gear; and in the preferred embodiments, each combination gear is provided with a narrowed shank portion intermediate these two separated areas. The washer component's three radially-extending support regions are positioned, respectively, between the shank portions of two combination gears of the planetary gear sets. In one preferred embodiment, each radially-extending support region is positioned between the shank portions of two meshing combination gears of each respective planetary set; while in another preferred embodiment, each radially-extending support region is positioned between the shank portions of two combination gears which are, respectively, associated with different respective planetary gear sets.

To facilitate lubrication and minimize wear between the opposite surfaces of the washer component and the respective side gear end faces, the washer surfaces are provided with a plurality of radial grooves. Preferably, four radial grooves are formed on each side of the washer, the grooves on each respective side being positioned at 90° spacings from each other, while the four radial grooves formed on one side of the washer are positioned at 45° spacings from the four radial grooves formed on the opposite side.

As is well understood, during differentiation, the side gears rotate in opposite directions at the same speed so that, when the confronting end faces of the side gears are in direct frictional contact with each other, the end face surfaces move over each other at a relative rate that is twice the rotational speed of each. Therefore, it will be appreciated that, by the introduction of my non-rotating washer component between the confronting side gear end faces, the relative frictional sliding velocity experienced by each end face is reduced by one-half, thereby significantly reducing its wear.

Also, the opposite sides of my non-rotating washer component may be treated in a manner similar to that disclosed in U.S. Pat. No. 4,890,511 (referred to in the Background portion of this specification). Namely, by selectively forming the surfaces of the opposite sides with materials having differing coefficients of friction, it is possible also to modify the differential's axle-to-axle torque bias ratios to reduce or increase overall bias and/or to ameliorate an unequal bias problem of the type described above.

DRAWINGS

DETAILED DESCRIPTION

Figure 1:
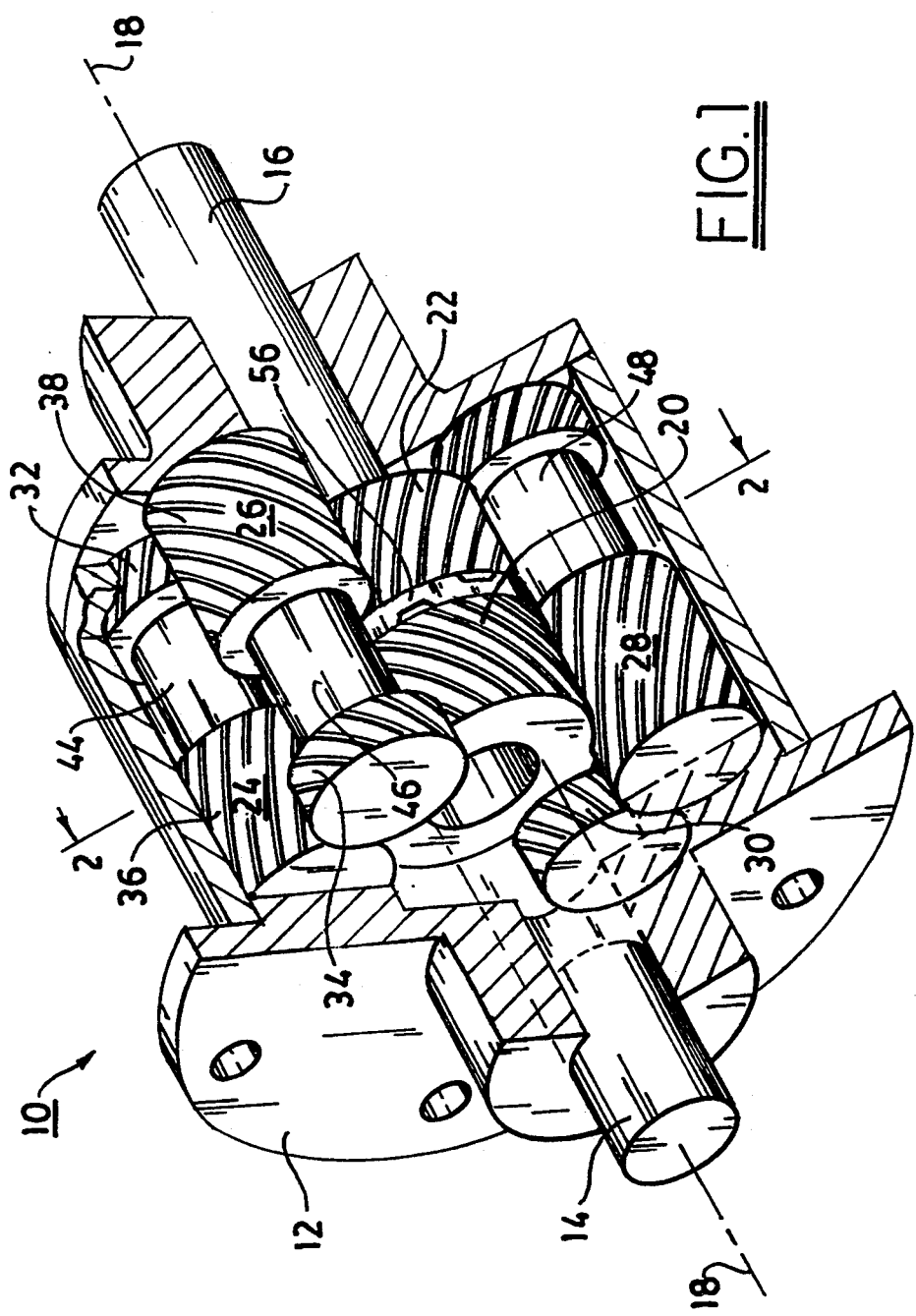
FIG. 1 is a partially schematic, perspective representation of a preferred embodiment of a torque-proportioning differential according to the invention, parts being removed to provide a simplified, less cluttered view of the planetary gear assembly and the washer component.

Referring to FIG. 1, a differential 10 has a housing 12 which receives and supports the ends of two drive axles 14, 16 which are both mounted concentric with axis 18. Fixed to the ends of axles 14, 16 are, respectively, side gears 20 and 22 which act as respective sun gears for the planetary gear arrangement shown.

Figure 2:
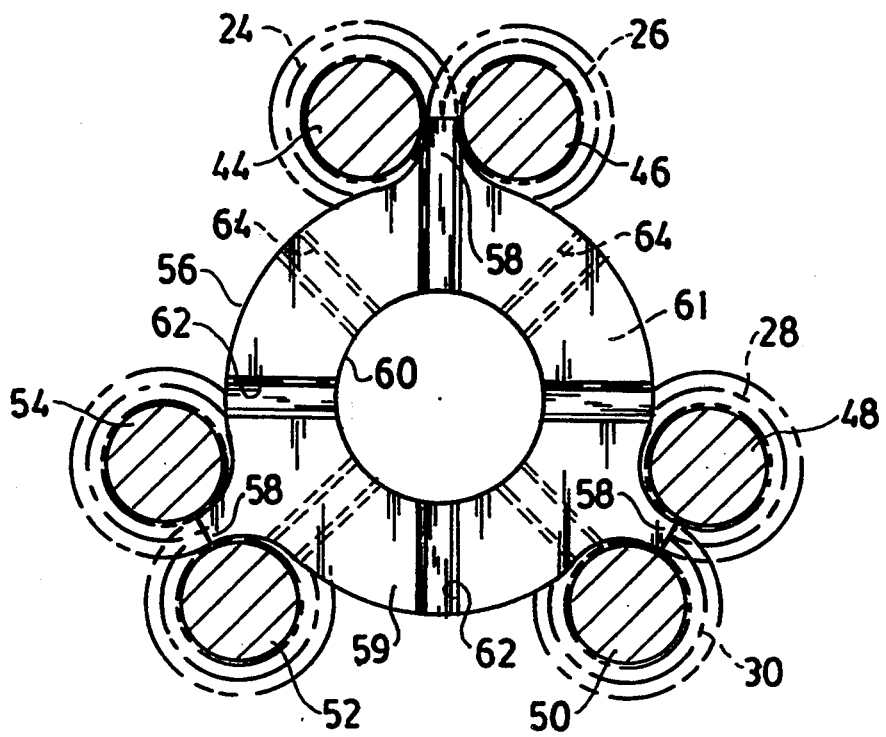
FIG. 2 is a partially schematic, cross-sectional view of a portion of the torque-proportioning differential according to the invention, being taken along the plane 2—2 of FIG. 1 and showing only the shank portions of the planetary gears in combination with a first embodiment of the washer component.
Figure 3:
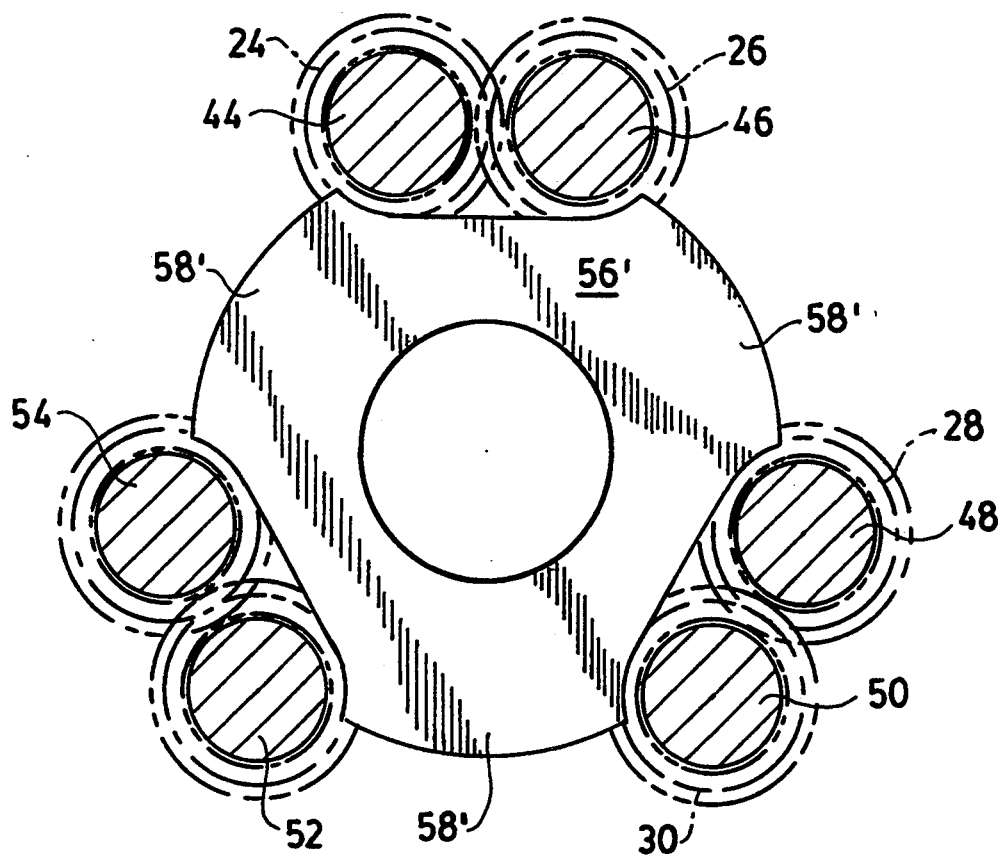
FIG. 3 is a partially schematic, cross-sectional view of a portion of the torque-proportioning differential according to the invention, being taken along the plane 2—2 of FIG. 1 and showing only the shank portions of the planetary gears in combination with a second embodiment of the washer component.

With respect to the planetary gear arrangement, the preferred embodiment of the invention includes three sets of planetary gear pairs equally spaced about the circumference of side gears 20, 22. However, to simplify and clarify the perspective view in FIG. 1, one of the planetary gear-pair sets has been removed and the distance has been increased between the two sets of planetary gears shown. The correct 120° spacing is shown in FIGS. 2 and 3.

The two sets of planetary gear pairs that can be seen in FIG. 1 comprise, respectively, combination gears 24, 26 and 28, 30. One combination gear of each planetary set is in mesh with a respective one of the side gears, e.g., combination gears 24 and 28 are in mesh with side gear 20, while combination gears 26 and 30 are in mesh with side gear 22. Further, the combination gears of each pair are in mesh with each other near their respective axial ends. As can be seen in FIG. 1, each combination gear 24, 26 has a respective axial end portion 32, 34 which meshes with the opposite end portion of its paired gear. At the opposite end of each combination gear is a larger contiguous meshing area 36, 38 carrying gear teeth which mesh with each gear's respective side gear 20, 22 as well as with the axial end portions 32, 34 of its paired combination gear.

Each combination gear also includes a respective shank portion 44, 46, 48, 50, 52, 54 (shown schematically in FIGS. 2 and 3) which is formed intermediate the gear's two separate and distinct meshing portions and which provides clearance to avoid interference with the sun/side gear associated with its paired combination gear. This construction can best be appreciated from the perspective view shown in FIG. 1.

Preferably, each combination gear is manufactured from a single piece of bar stock. However, each of the three distinct meshing portions of each combination gear could be manufactured from separate blanks, being appropriately interconnected, e.g., by splines to a common shaft, so that they rotate as a unit.

Each combination gear is appropriately mounted in housing 12 by any one of a number of well-known means, e.g., being supported in housing 12 in appropriate bearings that receive journals formed integrally at the axial ends of the gear blank, or being supported (as shown in FIG. 1) in pockets formed in housing 12.

The description thus far has included basic and well-known elements of the parallel-axis differential being improved by my invention. Attention is now called to the washer component 56 that is positioned between the confronting end faces of side gears 20, 22. A first preferred embodiment of washer component 56, as shown in FIG. 2, is provided with three radially-extending support regions 58, each specially-formed support region 58 being, respectively, configured to mate with and be positioned between the shank portions of the two meshing combination gears of each respective planet gear set.

Washer component 56 is also provided with (a) a central bore that is aligned with the central bores of side gears 20, 22 and (b) a plurality of radial grooves 62, 64 formed in its opposite sides that engage the confronting end faces of side gears 20, 22. Preferably, four such radial grooves are formed on each side of washer component 56, being positioned at 90° spacings from each other, the grooves 62 formed on one side being positioned at 45° spacings from the grooves 64 formed on the opposite side, as shown in FIG. 2. Central bore 60 reduces the weight of washer component 56, while radial grooves 62, 64 facilitate lubrication of the interfacing surfaces of washer component 56 and side gears 20, 22.

As indicated above, by positioning non-rotating washer component 56 between the confronting side gear end faces, the relative frictional sliding velocity experienced by each end face is reduced by one-half, thereby significantly reducing its wear. Also, the respective opposite sides of washer component 56 can be manufactured with selected surface materials having differing coefficients of friction. For instance, washer component 56 may be formed from two thin sheets of dissimilar materials, e.g., steel and brass; or the surfaces of its opposite sides can be friction-increasing or friction-decreasing (e.g., polytetrafluoroethylene) materials. In this manner, by selecting appropriate materials for surfaces 59 and 61 of washer component 56, it is possible to reduce or increase the frictional characteristics of the differential to modify its axle-to-axle torque bias ratios and/or to ameliorate unequal bias problems of the type referred to in the Background portion.

A second preferred embodiment of the washer component of my invention, as illustrated in FIG. 3, is identified by the reference numeral 56' and includes three radially-extending support regions 58' that are each positioned between the shank portions of two combination gears of the planetary gear sets. Namely, one support region 58' is positioned between the shank portions 46 and 48 of combination gears 26, 28; while a second support region 58' is positioned between combination gear shank portions 50 and 52, and the third support region 58' of washer component 56' is positioned between combination gear shank portions 54 and 52. In the simplified schematic view of FIG. 3, radial lubrication grooves have been omitted from the surfaces of washer component 56'.

I claim:

1. A parallel-axis differential assembly having:

a differential housing;

a pair of helical side gears having confronting end faces and respective central bores, said side gears being positioned in said housing for receiving through said central bores a pair of respective axle ends for rotation therewith about a common axis;

at least two sets of planetary gears supported in said housing, each said set having at least two combination gears and each respective combination gear in each said planetary set being in meshing engagement both with a respective one of said side gears and with another of the combination gears of its respective set, the meshing engagement of said side and planetary combination gears interconnecting said respective axle ends in a mutual driving relationship;

said combination gears being supported in said housing with their respective axes aligned in parallel with the common axis of said side gears; and the meshing combination gears of each said planetary set being in mesh with each other at two separated areas which straddle the position where each combination gear meshes with its respective side gear;

said assembly being characterized by:

each said combination gear having a narrowed shank portion intermediate its said separated areas;

a washer component having opposite sides in engagement with said confronting end faces of said side gears; and said washer component being provided with at least one radially-extending support region positioned between and mating with the shank portions of two combination gears of said planetary gear sets.

2. The assembly of claim 1 wherein each said radially-extending support region of said washer component is positioned between the shank portions of two meshingly engaged combination gears of a respective one of said planetary gear sets.

3. The assembly of claim 1 wherein each said radially-extending support region of said washer component is positioned between the shank portions of two combination gears which are, respectively, associated with different respective ones of said planetary gear sets.

4. The assembly of claim 1 further comprising at least three planetary gear sets, and wherein said washer is provided with at least three radially-extending support regions, each said support region being positioned between the shank portions of two combination gears of said planetary gear sets.

5. The assembly of claim 1 wherein said side gears have axially-aligned central bores and said washer is provided with a central bore that is aligned with said central bores of said side gears.

6. The assembly of claim 1 wherein said washer further comprises a plurality of radial lubrication grooves formed in said opposite sides engaging said confronting end faces of said side gears.

7. The assembly of claim 6 wherein four of said radial grooves are formed on each side of said washer, being positioned at 90° spacings from each other.

8. The assembly of claim 7 wherein said four radial grooves formed on one side of said washer are positioned at 45° spacings from said four radial grooves formed on said other side of said washer.

9. The assembly of claim 1 wherein said opposite sides of said washer component are formed with materials having differing coefficients of friction.

* * * * *